United States Patent [19]

Feast

[11] 4,272,426

[45] Jun. 9, 1981

[54] PREPARATION OF LATICES

[75] Inventor: Alan A. J. Feast, Eastleigh, England

[73] Assignee: The International Synthetic Rubber Company Ltd., South Hampton, England

[21] Appl. No.: 126,017

[22] Filed: Feb. 29, 1980

[30] Foreign Application Priority Data

Mar. 7, 1979 [GB] United Kingdom ............... 07999/79

[51] Int. Cl.³ ............................................. C08L 47/00
[52] U.S. Cl. .................................. 260/29.7 H; 526/80
[58] Field of Search ...................... 260/29.7 H, 29.7 T; 526/304, 80, 87

[56] References Cited

U.S. PATENT DOCUMENTS

| | | | |
|---|---|---|---|
| 2,868,754 | 1/1959 | Eilbeck | 260/29.7 |
| 3,344,103 | 9/1967 | Eilbeck | 260/29.7 T |
| 3,770,680 | 11/1973 | Iacoviello | 526/87 |
| 3,793,244 | 2/1974 | Megee | 526/80 |
| 3,970,629 | 7/1976 | Izaki | 260/29.7 H |
| 4,001,163 | 1/1977 | Matner | 260/29.7 T |
| 4,082,714 | 4/1978 | Scalzo | 526/80 |

FOREIGN PATENT DOCUMENTS

| | | |
|---|---|---|
| 842186 | 6/1939 | France . |
| 888503 | of 0000 | United Kingdom . |
| 707425 | 4/1954 | United Kingdom . |
| 935420 | 8/1963 | United Kingdom . |
| 1473851 | 5/1977 | United Kingdom . |

OTHER PUBLICATIONS

Rubber World, May 1963, pp. 38-45.

*Primary Examiner*—Paul R. Michl

[57] ABSTRACT

A process for preparing a carboxylated latex containing an N-alkylolamide of an unsaturated carboxylic acid comprises carrying out the polymerization reaction in two or more stages in which the majority (or all) of the N-alkylolamide monomer is supplied to the second stage. The reaction may be carried out using a batch procedure but a continuous reaction is preferred. The product latex is particularly suitable for paper and textile applications and especially for use in paper coating compositions.

21 Claims, No Drawings

PREPARATION OF LATICES

DESCRIPTION

This invention relates to the preparation of copolymer latices containing carboxyl groups by the polymerisation of monomers comprising at least one conjugated diene, at least one non-carboxylic comonomer and at least one ethylenically unsaturated carboxylic acid. Such latices are hereinafter referred to as "carboxylated latices."

The preparation of copolymers containing carboxyl groups by the polymerisation of monomers comprising at least one conjugated diene has been known for several decades. For example, French Pat. No. 842,186 (I. G. Farben, A.G.) describes the preparation of butadiene/alpha beta unsaturated acid copolymers. More recently a series of patents and papers was published by B. F. Goodrich Chemical Co., describing a wide variety of copolymers containing carboxyl groups, see for example, U.K. Pat. No. 707,425. At about the same time carboxylated latices were introduced commercially. Examples of such commercial latices are given in Rubber World, May, 1963, pages 38–45. Many variations in the amounts and types of the monomers employed in the polymerisation reaction have been made to provide a range of latices for the diversified uses of carboxylated latices. Amongst the types of functional monomers which have been used are those containing hydroxyl, ester, amine, amide, methylolamide, nitrile, sulphonate, aldehyde and epoxy groups. Examples of such monomers are acrylonitrile and alpha-alkyl substituted acrylonitriles; esters of acrylic and alpha substituted acrylic acids such as methyl methacrylate, ethyl acrylate, butyl acrylate, hexyl acrylate, 2-ethyl hexyl acrylate, beta hydroxy propyl (meth) acrylate, hydroxy ethyl acrylate; esters of alpha, beta ethylenically unsaturated polycarboxylic acids such as diethyl maleate and dibutyl fumarate; amides and substituted amides of alpha-beta ethylenically unsaturated acids such as acrylamide, methacrylamide, N-methyl (meth) acrylamide and N-methylol (meth) acrylamide. Variations have also been made in the type of unsaturated acid employed. Thus, for some applications, advantages have been claimed by employing a di or polycarboxylic acid, in place of or in addition to a monocarboxylic acid. (see for example, U.K. Pat. No. 935,420 (Milky Way Products) and U.S. Pat. No. 2,868,754 (B. F. Goodrich Co.)

In U.K. Pat. No. 888,503 (B. F. Goodrich) there is described a composition comprising an interpolymer of from 50% to 99.8% by weight of a conjugated diene, from 0% to 49.8% by weight of a mono-alkenyl monomer copolymerisable with said diene, from 0.1% to 10% by weight of an N-alkylolamide of an alpha beta-olefinically unsaturated carboxylic acid and from 0.1% to 10% by weight of an alpha-beta olefinically unsaturated carboxylic acid. The specification of this U.K. patent discloses a method for preparing the interpolymers by polymerisation of an aqueous dispersion of the monomers, and in particular a single stage batch reaction for preparing polymer latices from various combinations of the aforesaid monomers.

In our U.K. Pat. No. 1,473,851 we have disclosed a continuous process for the preparation of carboxylated latices employing a plurality of reactors, preferably two, in which all the reaction ingredients are supplied to the first reactor on a continuous basis. We have now found that carboxylated latices which, in use, give products having improved physical properties, may be prepared by this continuous process, and also by a batch process, by incorporating an N-alkylolamide monomer using a modified reaction procedure in which at least some of the N-alkylolamide monomer is added at an intermediate stage of the polymerisation process.

According to the present invention a process for the preparation of a carboxylated latex comprising (a) at least one conjugated diene, (b) at least one mono-vinyl non-carboxylic comonomer, (c) at least one ethylenically unsaturated carboxylic acid and, (d) at least one N-alkylolamide of an alpha beta-ethylenically unsaturated carboxylic acid comprises carrying out the polymerisation reaction in two or more stages in which all of monomeric components (a), (b) and (c) together with only a proportion or none at all of monomeric component (d) are polymerised to a conversion of 50% to 80% in the first stage, continuing the reaction in the second stage to which is supplied the balance or all of monomeric component (d) and recovering the carboxylated latex from the final stage.

Apart from giving a carboxylated latex which, in use, has improved physical properties, this procedure gives a more easily controlled polymerisation reaction. Furthermore the product latex is cleaner i.e., substantially coagulum and "bit" free which is of particular importance where the latex is for use in paper coating compositions.

The polymerisation reaction may be carried out as a batch reaction. However, it is preferably carried out by a continuous polymerisation process comprising (1) continuously supplying the monomers to a first reactor maintained at 70° C. to 85° C. and polymerising them therein for an average residence time of 3 to 5 hours; (2) continuously removing reaction mixture from the first reactor to at least one subsequent reactor maintained at 85° C. to 100° C. in which polymerisation is continued and (3) continuously removing the carboxylated latex from the last reactor, at least some of the N-alkylolamide comonomer being added to the second reactor. Three or more reactors may be used. However, in this particular embodiment of the invention, the continuous process is preferably carried out in two stirred tank reactors, with a total average residence time of 6 to 10 hours. The use of only two reactors, apart from simplifying the process, keeps the capital cost to a minimum.

The conjugated diene preferably has 4 to 10 carbon atoms, typically 4 to 6 carbon atoms. Butadiene, isoprene, and 2,3 dimethyl butadiene are examples, butadiene being preferred. The non-carboxylic comonomer may be a vinyl aromatic compound such as styrene, which is preferred, or an aliphatic monomer such as an unsaturated nitrile, for example, acrylonitrile or methacrylonitrile, or an ester of an unsaturated carboxylic acid with an alcohol having from 1 to 10 carbon atoms. Examples of suitable esters are methyl acrylate, ethyl acrylate, methyl methacrylate, hexyl acrylate and 2-ethyl hexyl acrylate. When unsaturated nitrile is employed it is preferably only used in up to 50% admixture with another of the abovementioned non-carboxylic monomers, especially styrene. Mixtures of non-carboxylic comonomers (other than with unsaturated nitrile monomers) may be used if desired. The amount of non-carboxylic comonomer used is preferably 30% to 85% by weight, more preferably 40% to 60% by weight based on total monomers.

The alpha beta-ethylenically unsaturated carboxylic acid used may be a mono carboxylic acid, a polycarboxylic acid, or a mixture of such acids. Preferably the acids have 2 to 10 chain carbon atoms. Acrylic acid, methacrylic acid, ethacrylic acid, crotonic acid and sorbic acid are examples of monocarboxylic acids that may be used, acrylic acid and methacrylic acid being preferred. Maleic acid, fumaric acid, itaconic acid and citraconic acid are examples of polycarboxylic acids that may be used, maleic acid, fumaric acid and, particularly, itaconic acid, being preferred. Substituted monocarboxylic acids and substituted polycarboxylic acids may be used if desired. The amount of carboxylic acid used is preferably 0.25% to 5.0% based on the weight of total monomers, more preferably 1% to 2.5%. The carboxylic acid supplied to the first stage is preferably in the free acid form. However, a portion of the acid may be premixed with the electrolyte and supplied to the reactor as the salt so obtained. In the case of a polycarboxylic acid, the salt may be that obtained by partial neutralisation or complete neutralisation, as desired.

The N-alkylolamide of an alpha beta-ethylenically unsaturated carboxylic acid used may be, for example, one of those mentioned in U.K. Pat. No. 888,503, the list of which is incorporated herein by reference. These generally have from 4 to 10 carbon atoms, N-methylolacrylamide and N-methylol methacrylamide being preferred. The amount of N-alkylolamide monomer used is preferably 0.5% to 5% based on the weight of total monomers, more preferably 1% to 2%.

In the process of the invention either all of monomeric component (d) is supplied to the second stage or the supply is split between the first and second stages. Where the supply is split, the proportion of component (d) supplied to the first stage should not exceed 50% by weight based on the total weight of component (d) supplied, and advantageously does not exceed 30%. Thus the majority (or all) of component (d) is supplied to the second stage. The division (if any) between the two stages depends upon the reaction conditions used. Where these are such that the stated conversion (50% to 80%) cannot be attained in the first stage in a reasonable period of time, it is preferred to split the addition between the two stages as just described. However, where a conversion within the stated range is achieved without difficulty, it is preferred to supply all of component (d) to the second stage.

Whilst not wishing to be bound by any particular theory, we believe that, by the addition of the N-alkylolamide monomer [component (d)] after a conversion of 50% to 80% has been achieved in the first stage, a high percentage of the N-alkylolamide monomer copolymerises on the surface of the growing latex particles. This gives particles having the main functional components (carboxyl and N-alkylolamide) on the surface which leads to superior properties in the applications in which the latex is used. Addition of the N-alkylolamide comonomer in this way, therefore, results in a more useful incorporation of this monomer, hence more efficient monomer usage and better process economics.

Preferred monomer combinations used in the present invention are butadiene/styrene/unsaturated acid/N-methylolacrylamide and a similar composition in which up to 50% of the styrene is replaced by acrylonitrile. The monomers supplied to the first stage may be supplied in separate streams but are preferably supplied in admixture. Preferably the acidic component is supplied as a dilute solution in water.

In the preferred embodiment of the invention wherein the two stage reaction is carried out as a continuous process in two stirred tank reactors with a total residence time of 6 to 10 hours, the first reactor is maintained at 70° C. to 85° C., preferably 75° C. to 80° C. and the second, and any subsequent reactor, at 85° C. to 100° C., preferably 90° C. to 95° C. Similar temperatures are generally employed when the process is carried out as a two stage batch reaction. Lower temperatures, for example, 50° C. to 60° C. may be used but the reaction time will be correspondingly longer. The reactor(s) used are normally equipped with jackets to control the temperature within the range specified and polymerisation proceeds under substantially constant temperature conditions in each stage. However it is preferred to adjust the reaction conditions so that most of the heat of polymerisation is absorbed by the reaction mixture. This may be assisted by precooling the monomer mixture supplied to the first stage. Where two or more reactors are used these need not be of the same volume.

The monomers are supplied to the first stage with emulsifier(s), electrolyte, a molecular weight modifier such as a mercaptan, (if used), and other ingredients well known in the emulsion polymerisation art. All these may be supplied to the first stage separately, but it is preferred first to prepare separate aqueous solutions of (1) the emulsifier and electrolyte; (2) the carboxylic acid; (3) the N-alkylolamide monomer and to mix these with the modifier and the other monomers in the metering and charging unit. The initiator, preferably a source of peroxydisulphate ion, is injected into this mixture in the supply line to the reactor. The emulsifier used is preferably an alkali metal or ammonium alkyl aryl sulphonate having up to twenty carbon atoms, such as sodium dodecylbenzene sulphonate or sodium dibutylnaphthalene sulphonate. Sodium toluene sulphonate which is not an emulsifier, is useful as an auxiliary. The amount of emulsifier used is preferably 1.0 to 3.0 parts by weight per hundred parts of monomer (phm), more preferably 1.2 to 2.0 phm. The total amount of water added to the reactor is preferably such as to give a concentration in the first stage of 50% to 58% by weight (material other than water). The N-alkylolamide comonomer is added in the second stage preferably as a solution in water at, for example, 40% to 80% concentration.

The majority of the polymerisation reaction takes place in the first stage. In other words, the first stage is not a prepolymerisation process in which only a low conversion of monomer to polymer (for example, 1% to 15%) occurs, that is, the reaction does not involve the preparation of a seed latex. As will be clear to those skilled in the art, the reactor(s) used must be pressure rated because the butadiene is copolymerised at elevated temperatures. Apart from the autogeneous pressure generated during the reaction, no external pressure need be applied. Polymerisation is carried out at an acidic pH, the pH being adjusted to the desired level when the latex is recovered.

The superior properties of the latex prepared by the process of the present invention, in use, are particularly noticeable in the field of paper coating, giving papers with improved dry and wet pick properties, and good wet strength characteristics. Improved pick properties are especially necessary when the coated paper is to be used for offset printing. Adjustment of the monomer ratios also enables latices to be obtained having the required softness and smoothness for rotogravure printing applications.

The present invention includes an aqueous composition for coating paper and board comprising a carboxylated latex prepared by the process of the invention and a pigment, and optionally other ingredients such as one or more dispersing agents, antifoam agents and thickening agents. Examples of pigments which may be used are clays, (for example, kaolin), calcium carbonate, talc, titanium dioxide, alumina, silica and satin white (satin spar). Clays and satin white are preferred.

However, latices prepared by the process of the present invention are not limited to paper coating applications. By varying the parameters of the process, latices suitable for a wide variety of applications may readily be prepared, a particularly important application being in secondary backing in the production of tufted carpets. In secondary backing processes a second layer of a backing such as hessian is applied to the back of the carpet and adhered to it using a latex compound. The latex compound is spread on to the back of the carpet and the secondary backing applied. The sandwich is then passed through a nip roller to aid adhesion and to ensure that sufficient compound penetrates into the carpet tufts. For secondary backing applications the latex must have good quick-grab characteristics, rapid drying properties, excellent tuft lock and high adhesion of the secondary backing. A typical formulation comprises 100 parts latex (dry weight), 200 to 400 parts of a filler such as a fine particle whiting, limestone or dolomite and a thickener, such as a polyacrylate. The amount of thickener used should be kept to a minimum for the best quick-grab characteristics.

Examples of other applications of the latices prepared by the process of the present invention are in the treatment of textiles and fibrous materials by saturation (impregnation) and backsizing techniques well known in the art.

The latex produced by the process of the present invention has highly gelled particles of average size 1700 to 1800 Å, (Dn) which is typical for "hot" polymerised carboxylated latices.

The following Examples illustrate the invention. (All parts quoted are parts by weight).

EXAMPLE 1

A carboxylated latex was prepared from butadiene, styrene, itaconic acid and N-methylolacrylamide (hereinafter NMA) using the following formulation:

| butadiene | 46.0 |
| styrene | 50.0 |
| itaconic acid | 2.0 |
| NMA | 2.0 |
| *sodium dodecyl benzene sulphonate | 1.8 |
| sodium toluene sulphonate | 0.45 |
| t-dodecyl mercaptan (TDM) | 0.7 |
| potassium carbonate | 0.5 |
| **chelating agent | 0.2 |
| ammonium persulphate | 0.85 |
| demineralised water | to 55% total solids (matter other than water). |

*For example, ARYLAN SC 30 - Diamond Shamrock Europe Ltd.
**DETAREX F - W. R. Grace ("Detarex" is a registered Trade Mark).

The polymerisation was carried out continuously in two reactors. The first reactor was maintained at 75° C. and the second at 85° C. All the NMA was added to the second reactor. Average residence time in the first reactor was 4.5 hours and the conversion of monomer to copolymer achieved in the first reactor was 80%. Overall conversion was 96% to 98%. The reaction was easy to control and gave an exceptionally clean (i.e., "bit" or speck-free latex).

Samples of this latex were compounded to a standard paper coating formulation of:

| kaolin | 100.0 |
| latex | 11.0 |
| carboxymethyl cellulose | 1.5 |
| MF resin | 1.0 | to give a coating colour of pH 8, total solids 60% and Brookfield viscosity (Spindle 4, 20 rpm, 25° C.) of 4000 cps. This was coated on to 100% bleached paper of weight 60 g/sq.m to a coating weight of 11 g/sq.m using a laboratory bench trailing blade coater and the coated paper dried in a forced air oven for 2 minutes at 110° C. The papers were calendered to about 60% gloss before testing (Paper A).

For comparison, similar paper samples were prepared using a high quality competitive latex of similar bound styrene content (Paper B) and likewise a carboxylated latex prepared as above only replacing the NMA by a mixture of an unsaturated monocarboxylic acid and a substituted ester of an unsaturated carboxylic acid.

These papers were tested with the following results:

| | | | for comparison | |
| | | Paper A | Paper B | Paper C |
| --- | --- | --- | --- | --- |
| (1) Reflectance | (%) | 87.0 | 87.0 | 87.0 |
| (2) 75° Specular Gloss | (%) | 57.6 | 53.1 | 59.7 |
| (3) K & N ink absorbency | (%) | 26.0 | 23.0 | 25.0 |
| (4) IGT dry pick | (cm/sec) | 195.0 | 179.0 | 168.0 |
| (5) wet pick* | | 2.0 | 2.5 | 4.5 |

*0 = no picking.
5 = complete picking.

The test methods used were the standard methods used in the paper coating industry.

It can be seen that the carboxylated latex prepared according to the invention gave a substantial improvement in dry pick and improved wet pick whilst retaining a good balance of the other properties.

EXAMPLE 2

A latex was prepared to the formulation given in Example 1 (except that the mercaptan level was 0.5 parts) by a two stage batch reaction carried out in a crown capped bottle, agitated in a bottle rotator for a total of 24 hours at 60° C. The N-methylolacrylamide was added after 16 hours, the conversion of monomer to polymer at this stage being 80%. Final conversion was 96% to 98%.

Paper coating formulations were prepared and tested as before using samples of this latex (Paper D) and the competitive latex as Ex.1. (Paper E), as well as from a latex prepared by the batch method described above only replacing the NMA by a mixture of an unsaturated carboxylic acid and an ester, as in Example 1, (Paper F) to ensure exact comparability of the results. The properties of each were:

|                        |         | for comparison |         |         |
| --- | --- | --- | --- | --- |
|                        |         | Paper D | Paper E | Paper F |
| (1) Reflectance        | (%)     | 88.0    | 88.0    | 88.0    |
| (2) 75° Specular Gloss | (%)     | 66.0    | 68.0    | 69.5    |
| (3) K & N ink absorbency | (%)   | 24.0    | 27.0    | 24.0    |
| (4) IGT dry pick       | (cm/sec)| 215.0   | 211.0   | 177.0   |
| (5) wet pick           |         | 0.5     | 0.5     | 2.0     |

EXAMPLE 3

Example 2 was repeated using different ratios, namely, butadiene 39, styrene 58, itaconic acid 2 and NMA 1. (Paper D' and Paper F')

|                        |          | Paper D' | Paper F' |
| --- | --- | --- | --- |
| (1) Reflectance        | (%)      | 88.0     | 88.0     |
| (2) 75° Specular Gloss | (%)      | 73.0     | 75.0     |
| (3) K & N ink absorbency | (%)    | 28.0     | 25.0     |
| (4) IGT dry pick       | (cm/sec) | 201.0    | 176.0    |
| (5) wet pick           |          | 1.0      | 2.5      |

EXAMPLE 4

Samples of the latex prepared in Example 2, (Latex D), a high quality competitive secondary backing latex of similar bound styrene content (Latex G) and of the comparison latex (Latex F) were tested in a secondary backing formulation:

|           | Parts (dry) |
| --- | --- |
| Latex     | 100 |
| Filler    | 300 |
| Thickener | To Brookfield viscosity 8,000–10,000 cps. (spindle 4, 20 rpm 20° C.) |
| Water     | To 70% total solids content |

Secondary backed carpet samples were prepared from each composition and tested with the following results:

|                            |         | for comparison |         |
| --- | --- | --- | --- |
|                            | Latex D | Latex G | Latex F |
| Quick grab (g/5cm)         | 1700    | 1600    | 1200    |
| Ultimate adhesion          |         |         |         |
| (kg/5cm) (3'/110° C.)      | 5.2     | 5.0     | 4.8     |
| (5'/150° C.)               | 7.3     | 6.9     | 6.4     |

What we claim is:

1. A process for the preparation of a carboxylated latex from monomeric components (a), (b), (c) and (d) in which (a) is at least one conjugated diene, (b) is at least one monovinyl non carboxylic comonomer, (c) is at least one ethylenically unsaturated carboxylic acid and (d) is at least one N-alkylolamide of an alpha beta-ethylenically unsaturated carboxylic acid wherein the polymerisation reaction is carried out in two or more stages in which all of monomeric components (a), (b) and (c) together with only a proportion or none at all of monomeric component (d) are polymerised to a conversion of 50% to 80% in the first stage, the reaction is continued in the second stage to which is supplied the balance or all of monomeric component (d) and the carboxylated latex is recovered from the final stage.

2. A process according to claim 1 wherein only two reaction stages are used.

3. A process according to claim 1 or claim 2 wherein the reaction is a continuous polymerisation.

4. A process according to claim 1 wherein the total amount of monomeric component (d) supplied to the polymerisation reaction is 0.5% to 5.0% based on the total weight of the monomeric components (a), (b), (c) and (d).

5. A process according to claim 4 wherein the total amount of monomeric component (d) is 1% to 2% on the same basis.

6. A process according to claim 1 wherein all of monomeric component (d) is supplied to the second stage.

7. A process according to claim 1 wherein the amount of monomeric component (d) supplied to the first stage does not exceed 30% of the total weight of monomeric component (d) supplied to the polymerisation reaction.

8. A process according to claim 3 wherein the reaction is carried out as a continuous process in two stirred tank reactors in which the first reactor is maintained at 70° C. to 85° C. and the second reactor is maintained at 85° C. to 100° C. and in which the average residence time in the first reactor is 3 to 5 hours.

9. A process according to claim 8 wherein total residence time is 6 to 10 hours.

10. A process according to claim 1 wherein the amount of monomeric component (d) supplied to the first stage does not exceed 50% of the total weight of monomeric component (d) supplied to the polymerisation reaction.

11. A process for the preparation of a carboxylated latex from monomeric components (a), (b), (c) and (d) comprising (a) at least one conjugated diene, (b) 30% to 85% by weight of at least one monovinyl noncarboxylic comonomer, (c) 0.25% to 5.0% by weight of at least one ethylenically unsaturated carboxylic acid and (d) 0.5% to 5.0% by weight of at least one N-alkylolamide of an alpha beta-ethylenically unsaturated carboxylic acid wherein the polymerisation reaction is carried out in two or more stages in which all of monomeric components (a), (b) and (c) together with only a proportion or none at all of monomeric component (d) are polymerised to a conversion of 50% to 80% in the first stage, the reaction is continued in the second stage to which is supplied the balance or all of monomeric component (d) and the carboxylated latex is recovered from the final stage.

12. A process according to claim 11 wherein all of monomeric component (d) is supplied to the second stage.

13. A process according to claim 11 wherein the amount of monomeric component (d) supplied to the first stage does not exceed 50% of the total weight of monomeric component (d) supplied.

14. A process according to claim 13 wherein the amount of monomeric component (d) supplied to the first stage does not exceed 30% of the total weight of monomeric component (d) supplied to the polymerisation reaction.

15. A process according to claim 1 where (a) is butadiene, (b) is styrene, (c) is itaconic acid and (d) is N-methylolacrylamide.

16. A process according to claim 11 where (a) is butadiene, (b) is styrene, (c) is itaconic acid and (d) is N-methylolacrylamide.

17. A process according to claim 1 wherein (b) is styrene, acrylonitrile, methacrylonitrile, methyl acrylate, ethyl acrylate, methyl methacrylate, hexyl acrylate or 2-ethylhexyl acrylate.

18. A process according to claim 11 wherein (b) is styrene, acrylonitrile, methacrylonitrile, methyl acrylate, ethyl acrylate, methyl methacrylate, hexyl acrylate or 2-ethylhexyl acrylate.

19. A process according to claim 11 wherein the reaction is carried out in the presence of 1 to 3 parts of emulsifier per 100 parts of monomers.

20. A process according to claim 19 wherein the reaction is carried out in the presence of peroxydisulfate ions as initiator.

21. A process according to claim 1 wherein the amount of N-alkylolamide is 0.5% to 5% of the total monomers.

* * * * *